(12) United States Patent (10) Patent No.: US 9,110,981 B1
Hamilton et al. (45) Date of Patent: Aug. 18, 2015

(54) PERFORMANCE REPORTING FOR MEDIA CONTENT BY SUBJECT

(71) Applicant: Google Inc., Mountain View, CA (US)

(72) Inventors: Theodore Kent Hamilton, Kusnacht (CH); Maximilian Georg Dylla, Sarrbrücken (DE); Lukas Renggli, Wädenswil (CH); Keekim Heng, Zürich (CH)

(73) Assignee: Google Inc., Mountain View, CA (US)

( * ) Notice: Subject to any disclaimer, the term of this patent is extended or adjusted under 35 U.S.C. 154(b) by 168 days.

(21) Appl. No.: 13/833,678

(22) Filed: Mar. 15, 2013

(51) Int. Cl.
*G06F 17/30* (2006.01)
(52) U.S. Cl.
CPC .................... *G06F 17/30705* (2013.01)
(58) Field of Classification Search
USPC .......................................................... 707/740
See application file for complete search history.

(56) References Cited

U.S. PATENT DOCUMENTS

| | | | |
|---|---|---|---|
| 7,490,009 B2* | 2/2009 | Gottlieb et al. ................. 702/32 |
| 7,509,228 B2* | 3/2009 | Bielefeld et al. ............. 702/173 |
| 2002/0188424 A1* | 12/2002 | Grinstein et al. ............. 702/183 |
| 2007/0016538 A1* | 1/2007 | Bielefeld et al. ............. 705/410 |
| 2013/0073336 A1* | 3/2013 | Heath .......................... 705/7.29 |
| 2014/0236882 A1* | 8/2014 | Rishe ............................. 706/50 |

* cited by examiner

*Primary Examiner* — Baoquoc N To
(74) *Attorney, Agent, or Firm* — Amin, Turocy & Watson, LLP

(57) ABSTRACT

Systems and techniques for generating analytic data for media content based on subject matter are presented. At least one topic is assigned to a media file in a set of media content. Analytic data is generated for the media file in the set of media content. Additionally, the analytic data is associated with the at least one topic.

11 Claims, 14 Drawing Sheets

PERFORMANCE REPORTING FOR MEDIA CONTENT BY SUBJECT

TECHNICAL FIELD

This disclosure generally relates to systems and methods that facilitate generating analytic data for media content.

BACKGROUND

The internet and media enabled portable computing devices have dramatically altered the processes for generating and consuming media content. Presently, users can consume media content virtually anywhere at any time, as long as they have access to a media capable device with an internet connection. The convenience of being able to view media content via the internet, essentially on demand, has resulted in explosive growth of internet media consumption. Internet media traffic is currently approaching a majority of consumer internet traffic, and the rate of demand is projected to continue increasing. For example, millions of people around the world have capability to produce media content, and popular online services can receive tens of hours worth of newly uploaded user-generated content every minute. In addition, traditional media outlets now have ability to enable consumers to access archives containing large amounts of older media content, along with newly generated content. As such, it can be useful to analyze media content utilized by consumers to determine performance of media content.

A self-service tool for users can be employed to assist users in analyzing statistical data for media content. For example, a self-service tool can provide information such as number of viewers of uploaded media content, demographics of the viewers, engagement of the viewers, etc. However, analysis of media content can be improved. Furthermore, due to the large quantity of different media content available, it can be difficult to determine desirability of media content to viewers.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a topics component and an analytics component. The topics component assigns at least one topic to a media file in a set of media content. The analytics component generates analytic data for the media file in the set of media content. Additionally, the analytics component associates the analytic data with the at least one topic.

Additionally, a non-limiting implementation provides for receiving at least one topic assigned to a media file in a set of media content, generating analytic data for the media file in the set of media content, and associating the analytic data with the at least one topic.

In accordance with another implementation, a system includes a topics component and an analytics component. The topics component determines at least one content category associated with a media file in a set of media. The analytics component aggregates analytic data with the at least one content category associated with the media file in the set of media.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
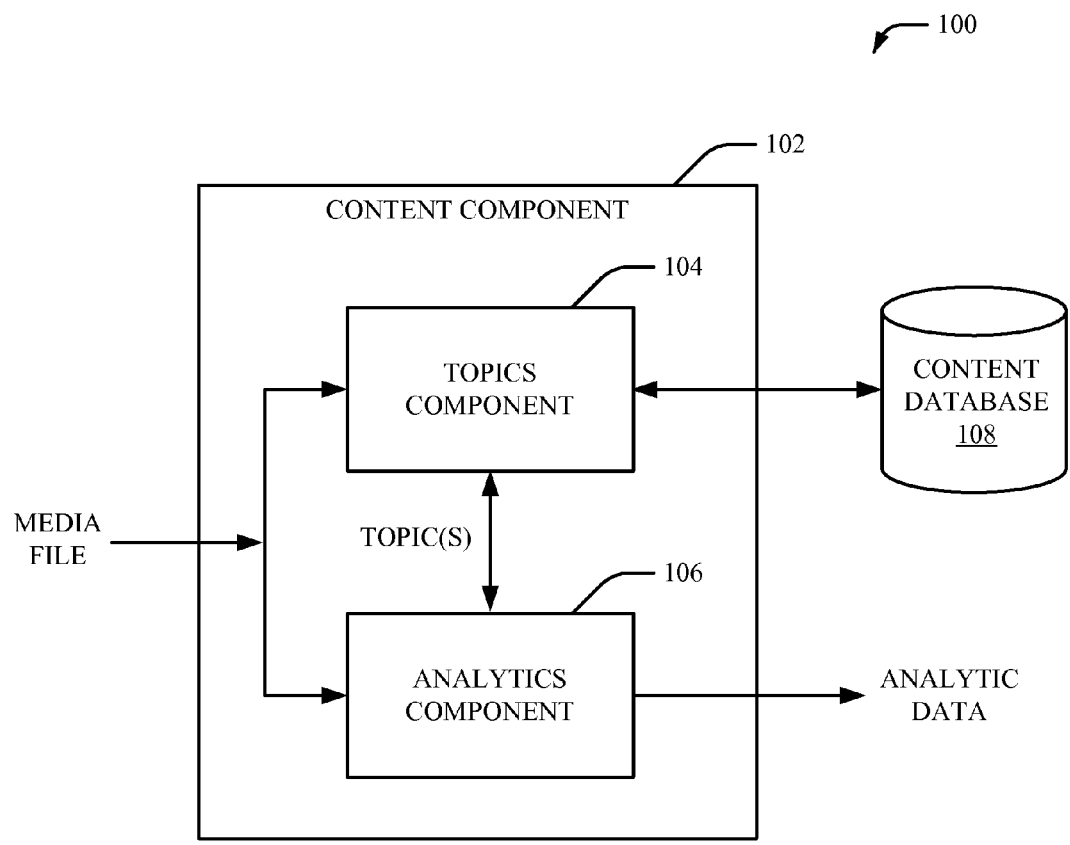
FIG. 1 illustrates a high-level block diagram of an example content component for generating analytic data for media content based on subject matter, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio and/or video content) to a server (e.g., a media content server). The media content can then be delivered (e.g., streamed) to other users. Service providers can provide network infrastructure for users. Additionally, the service providers can provide a self-service tool to allow users to obtain statistics associated with uploaded media content (e.g., the audio and/or the video content). As such, users can be provided with information such as number of viewers of uploaded media, demographics of viewers, engagement of viewers, etc. However, conventional self-service tools (e.g., provided by service providers) fail to provide a way to analyze and/or determine how media content of different subject matter perform and/or what topics audiences (e.g., the viewers) are interested in.

To that end, techniques for generating analytic data (e.g., statistical data) for media content based on subject matter (e.g., a topic, a dimension) are disclosed. In one example, a self-service tool can provide analytic data (e.g., statistical data) determined based on subject matter (e.g., a topic, a dimension) of media content. As such, it can be determined (e.g., based on the analytic data) how media content of different subject matter perform. Furthermore, subject matter consumers of media content are interested in (e.g., subject matter viewers of a video are interested in) can be determined. Accordingly, performance of media content based on subject matter can be determined.

Referring initially to FIG. 1, there is illustrated an example system 100 that can provide analytic data (e.g., statistical data) for media content based on subject matter (e.g., topics, dimensions, etc.), according to an aspect of the subject disclosure. In one example, the system 100 can be implemented on or in connection with one or more servers that host user-uploaded media content. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a content component with a topics feature (e.g., topics component 104) and an analytics feature (e.g., analytics component 106) that can be utilized in, for example, a media content application. The topics feature can assign at least one topic to a media file in a set of media content. The analytics feature can generate analytics data for the media file in the set of media content. Additionally, the analytics feature can associate the analytics data with the at least one topic. The system 100 can be employed by various systems, such as, but not limited to media server systems, content management systems, network systems, computer network systems, communication systems, router systems, server systems, high availability server systems (e.g., Telecom server systems), Web server systems, file server systems, disk array systems, powered insertion board systems, cloud-based systems, and the like.

In particular, the system 100 can include a content component 102 that includes a topics component 104 and an analytics component 106. In one example, the system 100 can be implemented in a server system (e.g., a media content server system). For example, the topics component 104 can be implemented on one or more servers and/or the analytics component 106 can be implemented on one or more other or a subset of same servers. In one example, the analytics component 106 can be implemented as an analytic engine (e.g., a business intelligence engine). Additionally, the system 100 can include a content database 108.

The content component 102 (e.g., the topics component 104 and/or the analytics component 106) can receive a media file (e.g., MEDIA FILE shown in FIG. 1). The media file (e.g., media content) can include but is not limited to a video (e.g., a video file, a video clip, a video sample, etc.), music (e.g., an audio file, an audio clip, an audio sample, etc.), an electronic book (e-book), a video game and/or user-generated content. It is to be appreciated that the media file can be in any recognizable and suitable media file format (e.g., video file format or audio file format), codec compression format, etc. In one example, the media file can be media content uploaded by a user (e.g., a user of a media sharing platform). For example, a user can upload the media file via a smart phone, a cell phone, a personal digital assistant (PDA), a tablet, a laptop, a desktop, a portable music player, a video game system, an electronic reader (e-reader), global positioning system (GPS), a set-top box, a television, etc.

The topics component 104 can be implemented as a categorization engine. The topics component 104 can assign at least one topic to the media file (e.g., media content) in a set of media content. For example, the topics component 104 can determine at least one content category associated with the media file in a set of media. The at least one topic (e.g., the at least one content category) can classify subject matter associated with the media file. For example, the at least one topic can include at least one subject matter element that classifies the media file. The at least one topic can be a word or a set of words (e.g., phrase) that describes content included in the media file. As such, the at least one topic can be a category that classifies the media file. The set of media content can include one or more media files. The set of media content can include, but is not limited to, a media channel and/or a media playlist. In one example, the set of media content can be generated (e.g., determined, created, etc.) by a user that uploaded the media file. It is to be appreciated that not every media file received by the content component 102 can be associated with a topic. For example, the topics component 104 can determine that a media file (e.g., a media file in a set of media content) is not associated with a topic.

In one example, the topics component 104 can assign a confidence level value to the media file. For example, the topics component 104 can assign a confident percentage value to the media file. In a non-limiting example, the topics component 104 can determine that a media file is 80% likely related to cars, and therefore can assign an 80% confidence value to the media file. The topics component 104 can assign a topic to a media file based on confidence level value assigned to the media file. For example, if a confidence level value for a topic is above a certain threshold value, the topic can be assigned to the media file. In one example, one or more factors can be weighted to determine confidence level value for a video. For example, a confidence level value can be weighted by number of times a media file is consumed (e.g., a video is viewed) in a particular context associated with a topic. In another example, a confidence level value can be weighted based on metadata associated with a media file. In yet another example, a confidence level value can be weighed based on previously generated analytic data associated with a media file. It is to be appreciated that a confidence level value can be weighted by more than one weight. Additionally, it is to be appreciated that different types of factors can be utilized to apply one or more weights to a confidence level value.

In an aspect, the at least one topic can be assigned to the media file in the set of media content algorithmically (e.g., a topic for a media file can be algorithmically determined). For example, topics can be determined based on content included in a media file, metadata (e.g., a title, a description, etc.) for a media file, one or more tags (e.g., comments, notes, ratings, reviews, etc.) for a media file, text from a website that includes a media file (e.g., an embedded media file), etc. In one example, a confidence level value can be weighted based on content included in a media file, metadata (e.g., a title, a description, etc.) for a media file, one or more tags (e.g., comments, notes, ratings, reviews, etc.) for a media file and/or text from a website that includes a media file (e.g., an embedded media file). The at least one topic assigned to the media file can change (e.g., can be updated) each time the media file is utilized. For instance, at least one topic assigned to a video can change (e.g., can be updated) each time the video is viewed. As such, a topic assigned to media file can be dynamic.

In an aspect, topics can be determined based on content stored in the database 108. For example, the topics component 104 can determine one or more possible topics based on media content stored in the database 108. The database 108 can include a plurality of media content with different content subject matter. As such, a topic for the media file can be determined based on the one or more possible topics.

The analytics component 106 can generate analytic data (e.g., ANALYTIC DATA shown in FIG. 1) for the media file in the set of media content. The analytics component 106 can associate the analytic data with the at least one topic. For example, the analytics component 106 can receive the at least one topic (e.g., TOPIC(S) shown in FIG. 1) from the topics component 104. As such, the analytics component 106 can aggregate analytic data with the at least one topic. The analytics data can be associated with at least one user that utilizes (e.g., a consumer that consumes) the media file. For example, the analytic data can provide information regarding at least one user that utilizes the media file. In one example, analytic data can provide information regarding at least one viewer that views a video. Utilization (e.g., consumption) of a media file by at least one user (e.g., consumer) can include but is not limited to viewing, listening, searching, downloading, sharing (e.g., posting on a social networking site, blogging, or linking to or embedding in a website), rating, and/or reviewing the media file.

The analytic data can include one or more metrics (e.g., categories, dimensions, etc.). For example, the analytic data can include at least one metric (e.g., at least one category, at least one dimension, etc.) for profiling information associated the at least one media user. The analytic data (e.g., the at least one metric, the at least one category, the at least one dimension, etc.) can include, but is not limited to, number (e.g., a quantity) of views of the media file, quantity or percentage of users that share (e.g., post, status, blog, etc.) a media file, geographical location of the at least one media user, an interval of time associated with the views of the media file, demographic information associated with the at least one media user, playback source (e.g., a playback device) of the media file by the at least one user, a monetary value associated with the media file, or source (e.g., a website) used by the at least one user to find the media file, etc.

In one example, the analytic data can be provided on a graphical user interface (GUI). For example, the analytic data can be provided to the user that uploaded the media file via a GUI. As such, the analytic data can be viewed and/or analyzed via the GUI. In another example, the analytic data can be provided to an application programming interface (API). As such, the analytic data can be downloaded (e.g., downloaded to at least one file) by a user.

In one example, the analytics component 106 can rank topics associated with a video based on the analytic data (e.g., the at least one metric, the at least one category, the at least one dimension, etc.). For example, the analytics component 106 can score (e.g., grade, classify, etc.) respective topics assigned to the media file as a function of the analytic data. As such, the analytics component 106 can rank respective topics assigned to a media file as a function of the score (score ranking). In one example, the analytics component 106 can rank the top topics (e.g., top 10 topics, top 25 topics, etc.) associated with a video. As such, it can be determined which topic(s) perform the best with regards to a video.

In another example, the analytics component 106 can rank videos according to a topic based on analytic data (e.g., the at least one metric, the at least one category, the at least one dimension, etc.). For example, the analytics component 106 can score (e.g., grade, classify, etc.) respective media files in the set of media content as a function of topics. As such, the analytics component 106 can rank respective media files in the set of media content as a function of score (score ranking). In one example, the analytics component 106 can rank the top videos (e.g., top 5 videos, top 20 videos, etc.) associated with a topic. As such, it can be determined which video(s) perform the best with regards to a topic.

In one example, the analytics component 106 can determine that a first set of media content (e.g., a first media channel) and a second set of media content (e.g., a second media channel) are related based on the topics assigned to media files included in the first set of media content and the second set of media content. For example, the analytics component 106 can recommend the second set of media content (e.g., the second media channel) to a user based on a determination that the first set of media content and the second set of media content include related topics. As such, a related set of media content (e.g., a related media channel) can be determined. In one example, the analytics component 106 can generate a channel profile (e.g., a channel fingerprint) for a media channel based on subject matter in the media channel. In a non-limiting example, the analytics component 106 can determine that viewers of a first media channel are interested in cars and boats, and that viewers of a second media channel are also interested in cars and boats. As such, it can be determined that the first media channel and the second media channel are related.

Accordingly, the analytics component 106 can provide analytic data to analyze performance of media content. In one non-limiting example, it can be determined based on analytic data and associated topic(s) that a media file (e.g., a video) related to sports earns $20 per 1,000 views and that a media file (e.g., a video) related to cats earns $10 per 1,000 views. As such, it can be determined how videos of different subject matter perform.

While FIG. 1 depicts separate components in system 100, it is to be appreciated that the components may be implemented in a common component. For example, the topics component 104 and the analytics component 106 can be included in a single component. Further, it can be appreciated that the design of system 100 can include other component selections, component placements, etc., to generate analytics data for a media file based on one or more topics associated with the media file.

Figure 2:
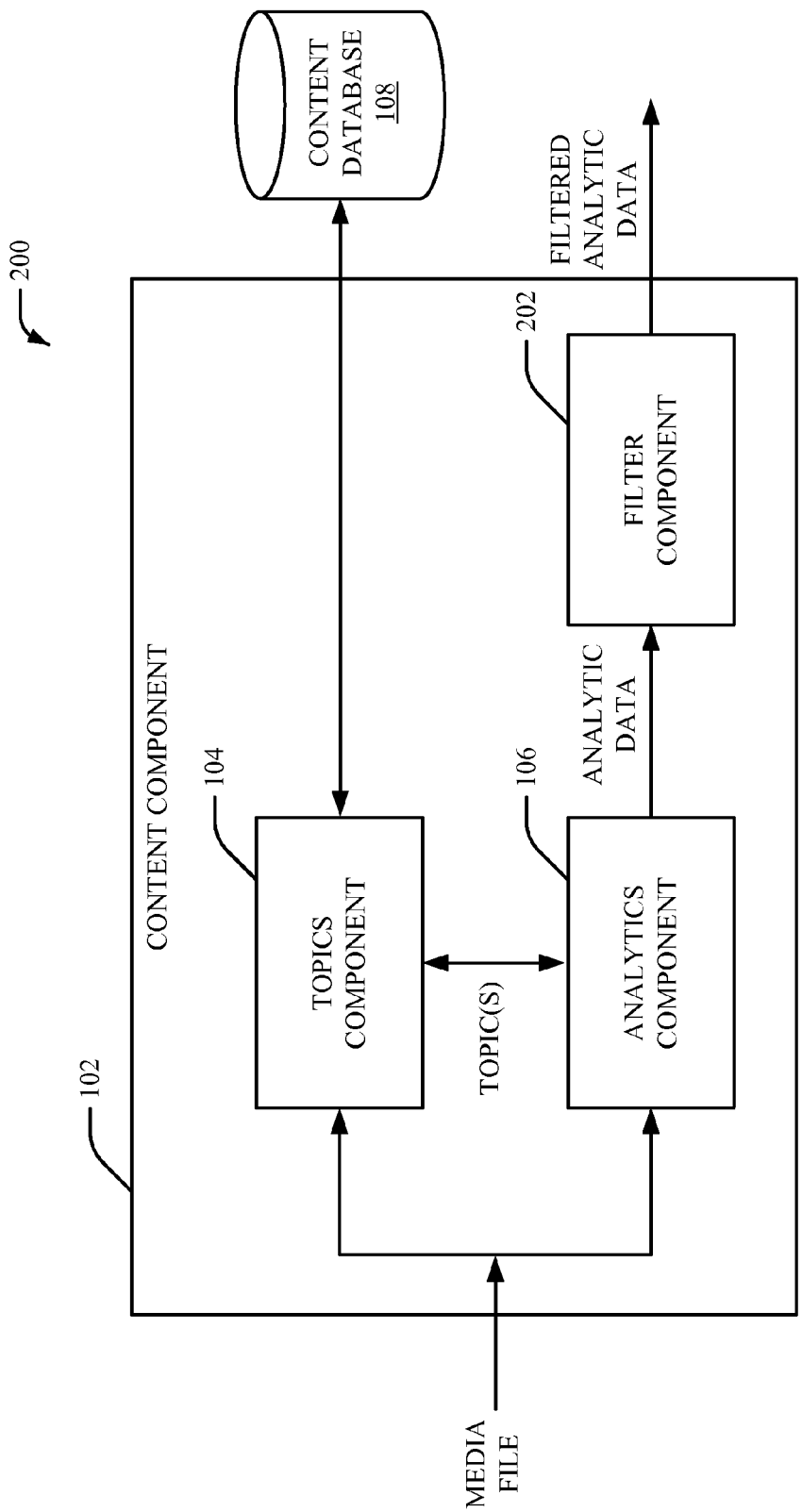
FIG. 2 illustrates a high-level block diagram of an example content component with a filter component for filtering analytic data for media content, in accordance with various aspects and implementations described herein.

FIG. 2 illustrates a non-limiting implementation of system 200 in accordance with various aspects and implementations of this disclosure. The system 200 includes content component 102. The content component 102 can include topics component 104, analytics component 106 and/or a filter component 202. Additionally, the system 200 can include content database 108.

The filter component 202 can apply at least one data filter to the analytic data. As such, the filter component 202 can filter the analytic data to generate filtered analytic data (e.g., FILTERED ANALYTIC DATA shown in FIG. 2). For example, the analytic data can be sorted based on an ascending or descending order. In another example, the analytic data can be filtered based on an interval of dates (e.g., start date and an end date). In yet another example, the analytic data can be filtered by day, week, month, year, etc. However, it is to be appreciated that the analytic data can be filtered by a different type of metric. As such, the filter component 202 can filter analytic data based on one or more metrics. In one example, the filter component 202 can filter analytic data based on input from a user (e.g., an action of the at least one media user). For example, a user can specify how to filter the analytic data. As such, analytic data present to a user (e.g., via a GUI) can be filtered based on at least one data filter.

Figure 3:
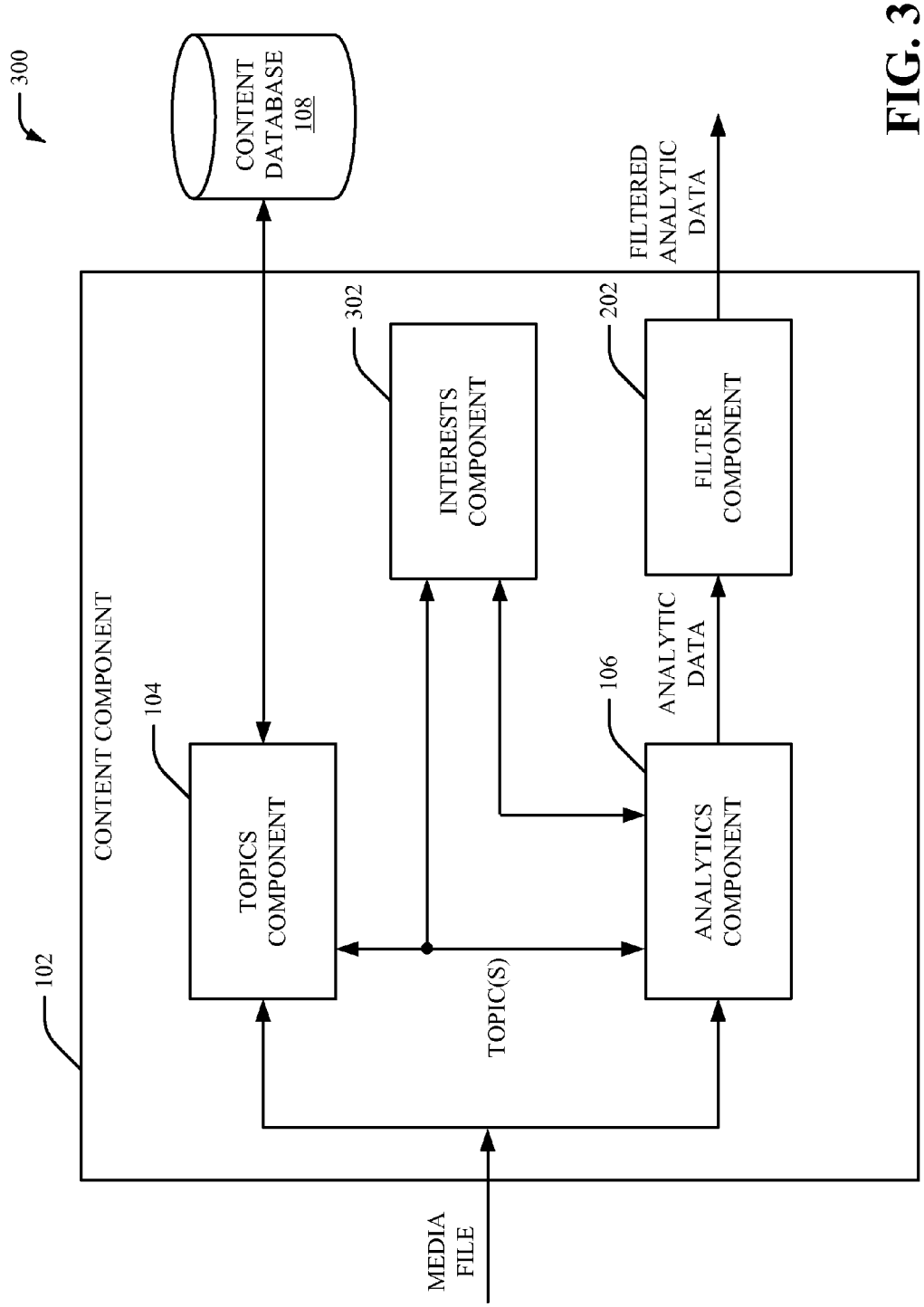
FIG. 3 illustrates a high-level block diagram of an example content component with an interests component for generating analytic data for media content based on subject matter and user interests, in accordance with various aspects and implementations described herein.

Referring to FIG. 3, there is illustrated a non-limiting implementation of system 300 in accordance with various aspects and implementations of this disclosure. System 300 includes content component 102. The content component 102 can include topics component 104, analytics component 106, filter component 202 and/or interests component 302.

The interests component 302 can determine previously generated data and/or at least one other topic. For example, interests component 302 can track user history (e.g., viewer history) to determine media user interests (e.g., interests of viewers). Interests component 302 can determine whether a media user (e.g., a viewer) has previously viewed at least one video (e.g., at least one previous video). If so, the interests component 302 can generate user history data for the media user based on the at least one previous video. For example, interests component 302 can generate interest data for the media user (e.g., the viewer) that previously viewed at least one previous video before viewing the media file (e.g., the video) received by the content component 102. Furthermore, interests component 302 can generate a topic profile (e.g., an interest profile, a topic fingerprint) for the media user (e.g., the viewer) based on user history. For example, a topic profile (e.g., an interest profile) for the viewer can be generated based on the at least one previously viewed video. The topic profile (e.g., the interest profile) can include at least one topic associated with the at least one previously viewed video. In one example, the at least one topic included in the topic profile can be different that topic(s) associated with the media file (e.g., the media file received by content component 102). As such, interests component 302 can determine previously generated data and/or at least one other topic associated with at least one media user that utilizes the media file.

Furthermore, interests component 302 can add the at least one other topic and/or the previously generated data to the analytic data. For example, interests component 302 can provide the at least one other topic and/or the previously generated data to the analytics component 106. Therefore, topic(s) that viewers of a video are interested in can be determined and/or associated with the video. Accordingly, interests of viewers (e.g., determined based on at least one previously viewed video) can be associated with a video (e.g., a video received by the content component 102).

In one non-limiting example, content component 102 can receive a video. Interests component 302 can determine that viewers of the video mostly commonly watched videos about cars and food. As such, interests component 302 can determine interests of viewers that watched the video. In another non-limiting example, analytics component 106 can determine that a video is related to vegetables. Additionally, interests component 302 can determine (e.g., based on viewer history and/or a topic profile) that at least one viewer that viewed the video is interested in videos about gardening. As such, interests component 302 and/or the analytics component 106 can determine one or more other topics related to the video. Therefore, additional video content to invest in and/or to promote to a viewer audience can be determined based on subject matter.

Figure 4:
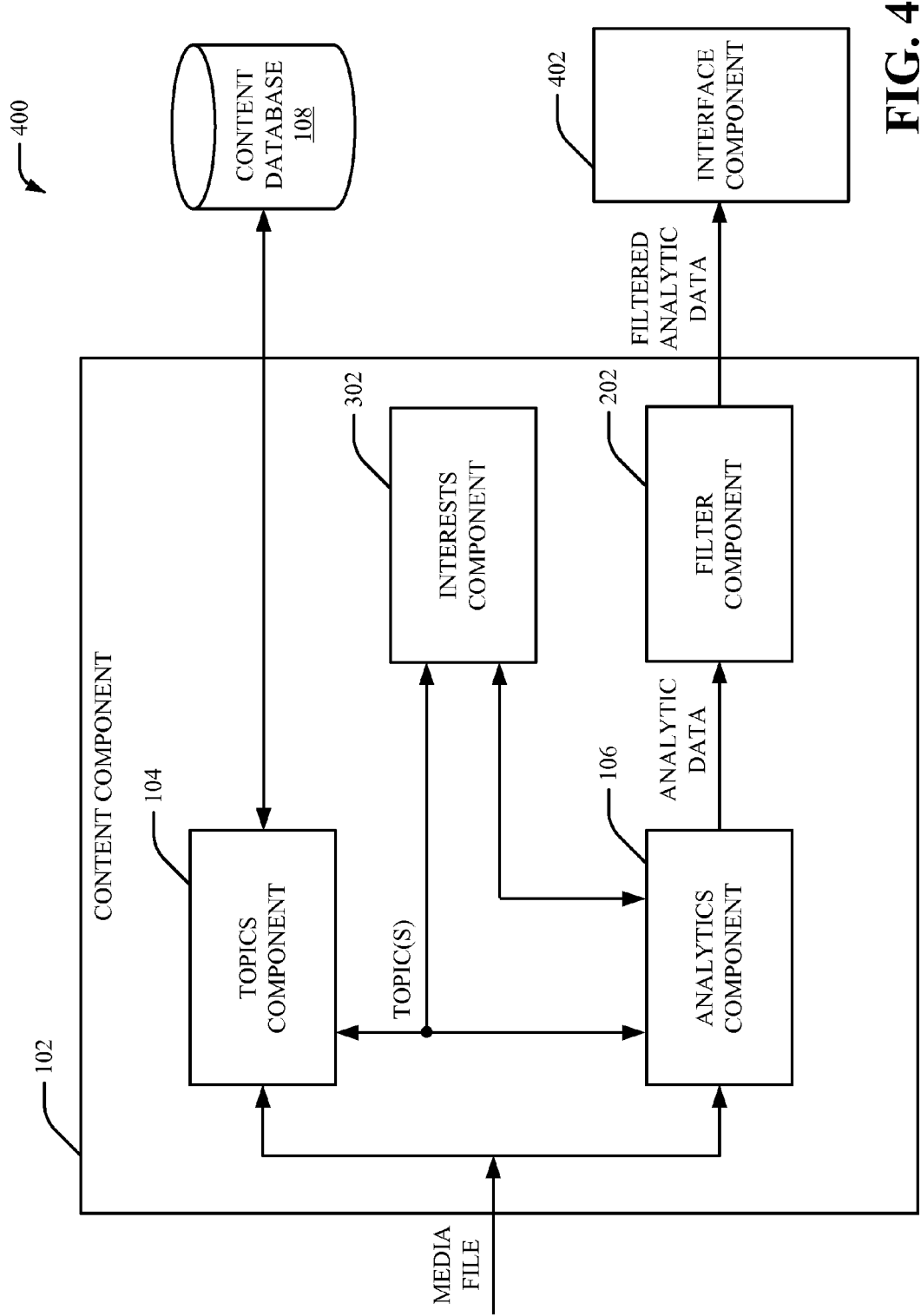
FIG. 4 illustrates a high-level block diagram of an example content component and an interface component providing analytic data for media content based on subject matter, in accordance with various aspects and implementations described herein.

Referring to FIG. 4, there is illustrated a non-limiting implementation of system 400 in accordance with various aspects and implementations of this disclosure. System 400 includes content component 102 and interface component 402. The content component 102 can include topics component 104, analytics component 106, filter component 202 and/or interests component 302. In one example, the interface component 402 can be implemented separate from the content component 102. In another example, the content component 102 can include the interface component 402. Additionally, the system 400 can include content database 108.

The system 400 can be integrated with a web-based self-service tool. The interface component 402 can present a user with the analytic data (e.g., the filtered analytic data). For example, the interface component 402 can generate a user interface (e.g., a graphical user interface) for the user to allow the user to view and/or analyze the analytic data (e.g., the filtered analytic data). For example, the interface component 402 can provide analytic data (e.g., the filtered analytic data) to a user associated with the set of media content. The analytic data (e.g., the filtered analytic data) can be provided to the user associated with the set of media content based at least in part on the at least one data filter. At least one topic can be selected by the user (e.g., the user can select which topics to view and/or analyze). In one example, a user can determine (e.g., select) the at least one data filter to apply to the analytic data. In one example, the interface component 402 can present the user with graphical data based on the analytic data (e.g., the filtered analytic data). As such, the user can view topic(s) and analytic data associated with the media file. Therefore, the interface component 402 can allow the user to analyze how media files (e.g., videos) of different subject matter perform. Additionally or alternatively, the interface component 402 can present the user with analytic data generated by the interests component 302. As such, the interface component 402 can allow the user to analyze what topics viewers of the media file are interested in.

In one implementation, the interests component 302 and/or the interface component 402 can notify users of the types of information that are stored, transmitted, monitored and/or shared, and can provide the users opportunities to choose not to have such information stored, transmitted, monitored and/or shared.

Figure 5:
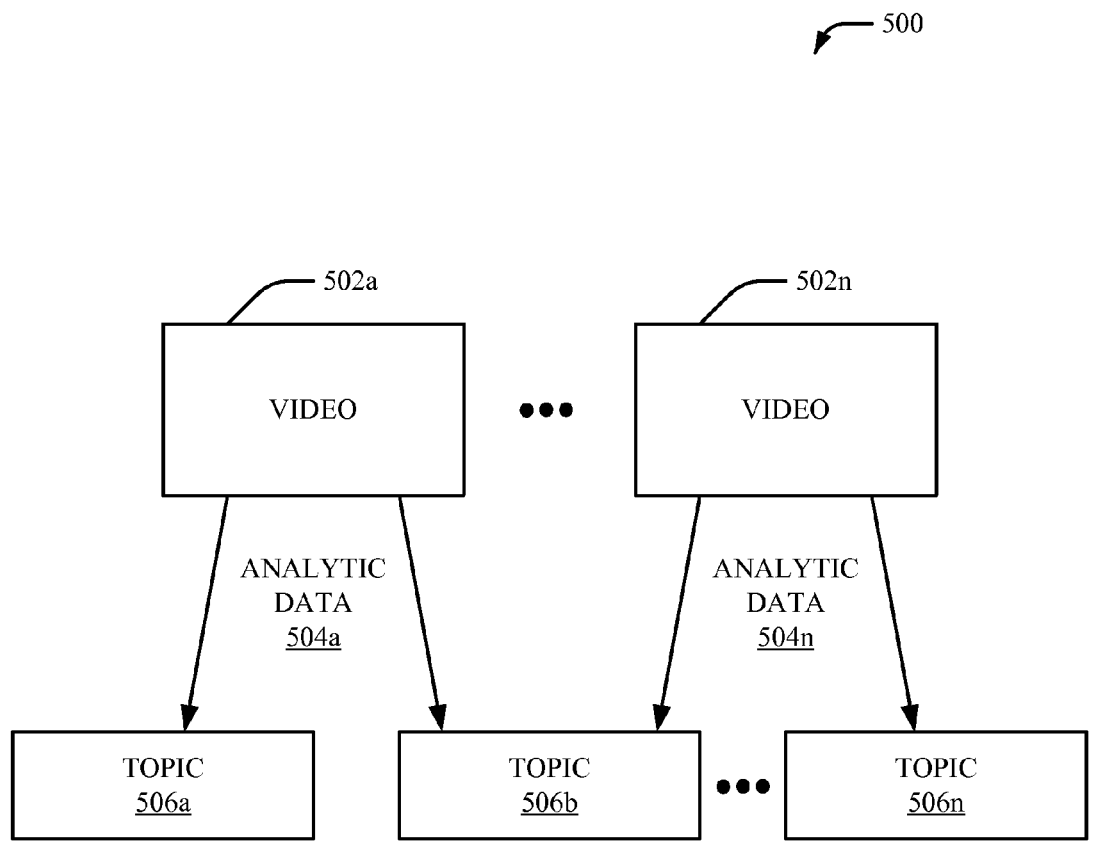
FIG. 5 illustrates an example technique for generating analytic data for media content based on subject matter, in accordance with various aspects and implementations described herein.

Referring to FIG. 5, there is illustrated a non-limiting implementation of a system 500 for implementing a technique in accordance with various aspects and implementations of this disclosure. The system 500 includes video 502a, video 502n, analytic data 504a, analytic data 504n, topic 506a, topic 506b and topic 506n. The video 502a and the video 502n can be uploaded by a user to a media content server. For example, a user can upload the video 502a and the video 502n via a smart phone, a cell phone, a personal digital assistant (PDA), a tablet, a laptop, a desktop, a portable music player, a video game system, an electronic reader (e-reader), global positioning system (GPS), a set-top box, a television, etc. It is to be appreciated that the system 500 can include a different number of videos.

The video 502a can be associated with the analytic data 504a and the video 502n can be associated with the analytic data 504n. For example, the analytic data 504a can be analytic data (e.g., statistical data) for the video 502a and the analytic data 504n can be analytic data (e.g., statistical data) for the video 502n. Additionally, the topic 506a, the topic 506b and the topic 506n can be topics (e.g., subject matter) associated with the video 502a and/or the video 502n. For example, the topic 506a and the topic 506b can be associated with the video 502a. The topic 506b and the topic 506n can be associated with the video 506n. As such, the analytic data 504a can also be associated with the topic 506a and the topic 506b, and the analytic data 504n can also be associated with the topic 506b and the topic 506n. Therefore, the topic 506a can acquire (e.g., inherit) analytic data from the video 502a, the topic 506b can acquire (e.g., inherit) analytic data from the video 502a and the video 502n, and the topic 506n can acquire (e.g., inherit) analytic data from the video 502n.

In one non-limiting example, the video 502a can be viewed 1,000 times (e.g., a value of 1,000 views is included in analytic data 504a) and the video 502n can be viewed 20,000 times (e.g., a value of 20,000 views is included in analytic data 504n). Furthermore, the topic 506a can be categorized as pop music, topic 506b can be categorized as a song, and topic 506n can be categorized as a music video. As such, the video 502a can be associated with pop music and a song. Additionally, video 502n can be associated with a song and a music video. Therefore, since the video 502a is associated with 1,000 views, pop music (e.g., topic 506a) and song (e.g., topic 506b) can also be associated with 1,000 views. Additionally, song (e.g., topic 506b) can also be associated with 20,000 views (for a total of 21,000 views) and music video (topic 506n) can be associated with 20,000 views. As such, it can be determined that subject matter about songs is the most relevant topic for the video 502a and the video 502n. Furthermore, it can be determined how video(s) of different subject matter perform.

Figure 6:
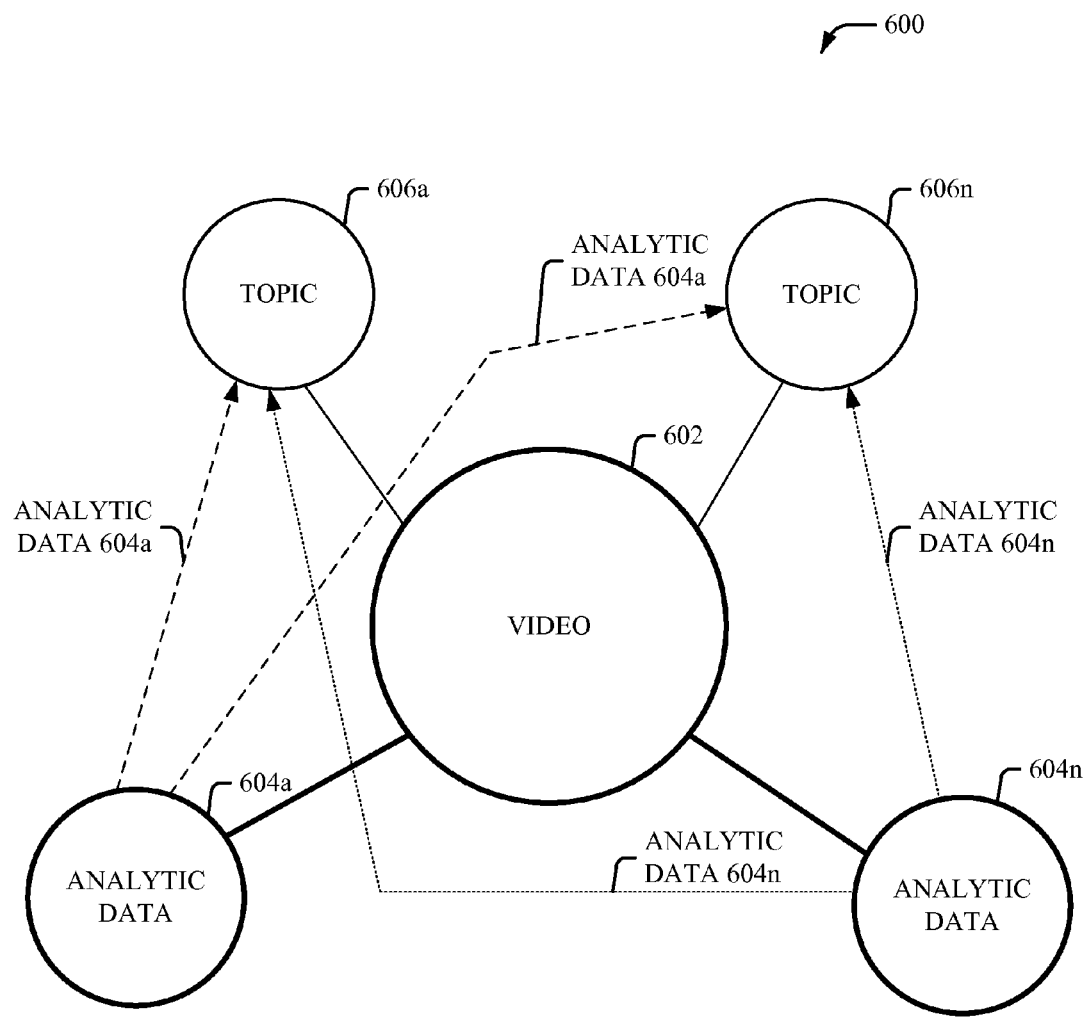
FIG. 6 illustrates another example technique for generating analytic data for media content based on subject matter, in accordance with various aspects and implementations described herein.

Referring to FIG. 6, there is illustrated a non-limiting implementation of a system 600 for implementing a technique in accordance with various aspects and implementations of this disclosure. The system 600 includes video 602, analytic data 604a, analytic data 604n, topic 606a and topic 606n. The video 602 can be uploaded by a user to a media content server. For example, a user can upload the video 602 via a smart phone, a cell phone, a personal digital assistant (PDA), a tablet, a laptop, a desktop, a portable music player, a video game system, an electronic reader (e-reader), global positioning system (GPS), a set-top box, a television, etc.

The video 602 can be associated with the analytic data 604a and the analytic data 604n. For example, the analytic data 604a and the analytic data 604n can be analytic data (e.g., statistical data) for the video 602. It is to be appreciated that a video can be associated with a different number of analytic data. Additionally, the topic 606a and the topic 606n can be topics (e.g., subject matter) associated with the video 602. It is to be appreciated that a video can be associated with a different number of topics. As such, the analytic data 604a and the analytic data 604n can also be associated with the topic 606a and the topic 606n. Therefore, the topic 606a and the topic 606n can acquire (e.g., inherit) analytic data associated with the video 602.

In one non-limiting example, the video 602 can be viewed 10,000 times (e.g., a value of 10,000 views is included in analytic data 604a) and is shared 500 times (e.g., a value of 500 shares is included in analytic data 604n). Furthermore, the topic 606a can be categorized as sports and the topic 606n can be categorized as basketball. As such, the video 602 can be associated with sports and basketball. Therefore, since the video 602 is associated with 10,000 views (e.g., analytic data 604a) and 500 shares (e.g., analytic data 604n), sports (e.g., topic 606a) and basketball (e.g., topic 606n) can also be associated with 10,000 views and 500 shares. As such, analytic data 604a and analytic data 604n associated with the video 602 can also be associated with the topic 606a and the 606n. Therefore, it can be determined how video(s) of different subject matter perform.

Figure 7:
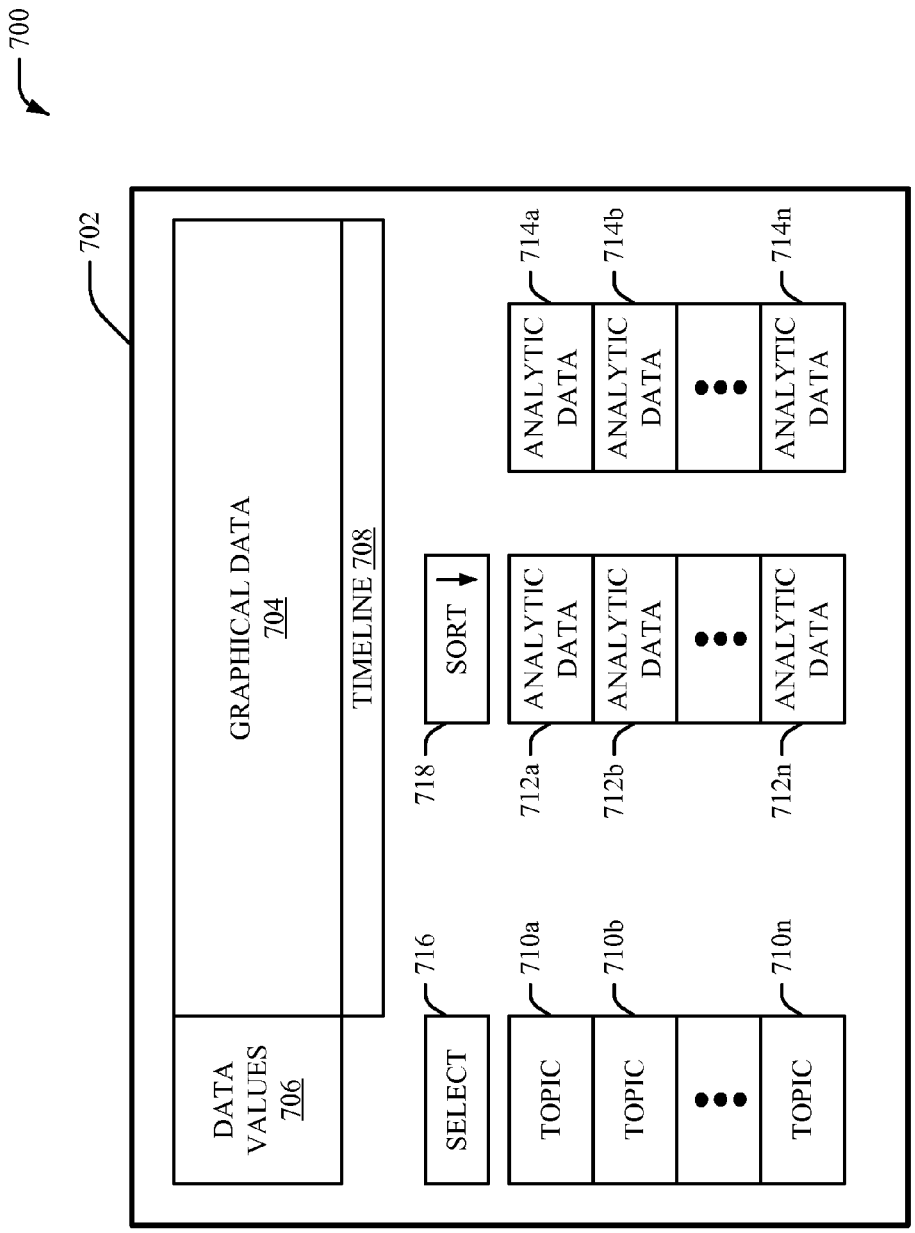
FIG. 7 illustrates an example user interface, in accordance with various aspects and implementations described herein.

Referring to FIG. 7, there is illustrated a non-limiting implementation of a system 700, in accordance with various aspects and implementations of this disclosure. The system can be implemented in connection with the topics component 104, the analytics component 106, the filter component 202, the interests component 302 and/or the interface component 402. The system 700 illustrates an example webpage 702 (e.g., a graphical user interface to allow a user to view and/or analyze analytic data associated with at least one topic). In one example, the webpage 702 can be a self-service tool associated with a video hosting website. The webpage 702 can include graphical data 704, data values 706, a timeline 708, one or more topics 710a-n, one or more analytic data 712a-n, one or more analytic data 714a-n, a select button 716 and a sort button 718. The topics 710a-n, the analytic data 712a-n and the analytic data 714a-n can be associated with at least one media file. For example, topics 710a-n, the analytic data 712a-n and the analytic data 714a-n can be associated with at least one media file in a set of media content (e.g., a media channel). In one example, a user can sort (e.g., filter) analytic data by selecting the sort button 718. However, it is to be appreciated that the topics 710a-n, the analytic data 712a-n and the analytic data 714a-n can be filtered in a different way (e.g., via the filter component 202). Therefore, a user can manually specify the topic(s) that include analytic data and/or are included in the graphical data 704.

In a non-limiting example, topic 710a can be categorized as song, topic 710b can be categorized as film, topic 710c can be categorized as pop music, topic 710d can be categorized as music, topic 710e can be categorized as video game, topic 710f can be categorized as dance, topic 710g can be categorized as alternative rock, topic 710h can be categorized as hip hop music, topic 710i can be categorized as music video and topic 710j can be categorized as contemporary R&B. The topics 710a-j can be associated with at least one video.

Analytic data 712a can be associated with topic 710a, analytic data 712b can be associated with topic 710b, analytic data 712c can be associated with topic 710c, etc. Furthermore, analytic data 712a can include 1,000,000 views, analytic data 712b can include 900,000 views, analytic data 712c can include 800,000 views, analytic data 712d can include 700,000 views, analytic data 712e can include 600,000 views, analytic data 712f can include 500,000 views, analytic data 712g can include 400,000 views, analytic data 712h can include 300,000 views, analytic data 712*i* can include 200,000 views and analytic data 712*j* can include 100,000 views.

Additionally, analytic data 714*a* can be associated with topic 710*a*, analytic data 714*b* can be associated with topic 710*b*, analytic data 714*c* can be associated with topic 710*c*, etc. Furthermore, analytic data 714*a* can include 2,095,657,080 estimated minutes watched, analytic data 714*b* can include 3,642,610,719 estimated minutes watched, analytic data 714*c* can include 2,268,097,501 estimated minutes watched, analytic data 714*d* can include 1,530,080,894 estimated minutes watched, analytic data 714*e* can include 2,286,417,230 estimated minutes watched, analytic data 714*f* can include 861,633,169 estimated minutes watched, analytic data 714*g* can include 1,283,581,089 estimated minutes watched, analytic data 714*h* can include 1,189,642,136 estimated minutes watched, analytic data 714*i* can include 994,209,133 estimated minutes watched and analytic data 714*j* can include 1,047,969,420 estimated minutes watched. As such, the analytic data 712*a-j* and the analytic data 714*a-j* can be sorted (e.g., via the sort button 718) by number of views (e.g., from most number of views to least number of views).

In addition, the graphical data 704 can include graphical data for the topics 716*a-j*. For example, the select button 716 can be used to select all of the topics 710*a-j*. In another example, each topic 710*a-j* can be individually selected via a unique select button associated with each topic 710*a-j*. Each of the selected topics 716*a-j* can be included in the graphical data 704. Furthermore, the analytic data selected by the sort button 718 can be included in the graphical data 704. As such, the analytic data 712*a-j* can be included in the graphical data 704 since the topics 710*a-j* are sorted by number of views. Accordingly, data values 706 can represent number of views. In one example, the graphical data 704, the data values 706, and the timeline 708 can be configured to shown number of views for each topic 710*a-n* f by date (e.g., for each day, for each week, for each month, for each year, etc.). However, it is to be appreciated the graphical data 704 can be filtered in a different way. Each topic 710*a-n* can be represented by a different color, a different line weight and/or a different line pattern on the graphical data 704. In one example, the timeline 708 can be filtered to show analytic data (e.g., graphical data) for a certain timeframe (e.g., a start date and an end date for the timeline 708 can be specified).

It is to be appreciated that the webpage 702 is merely an example. Therefore, the location and/or content of the graphical data 704, the timeline 708, the data values 706, the topics 710*a-n*, the analytic data 712*a-n*, the analytic data 714*a-n*, the select button 716 and/or the sort button 718 can be varied. Furthermore, the webpage 702 can include other features, content and/or functionalities not shown in FIG. 7.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 8:
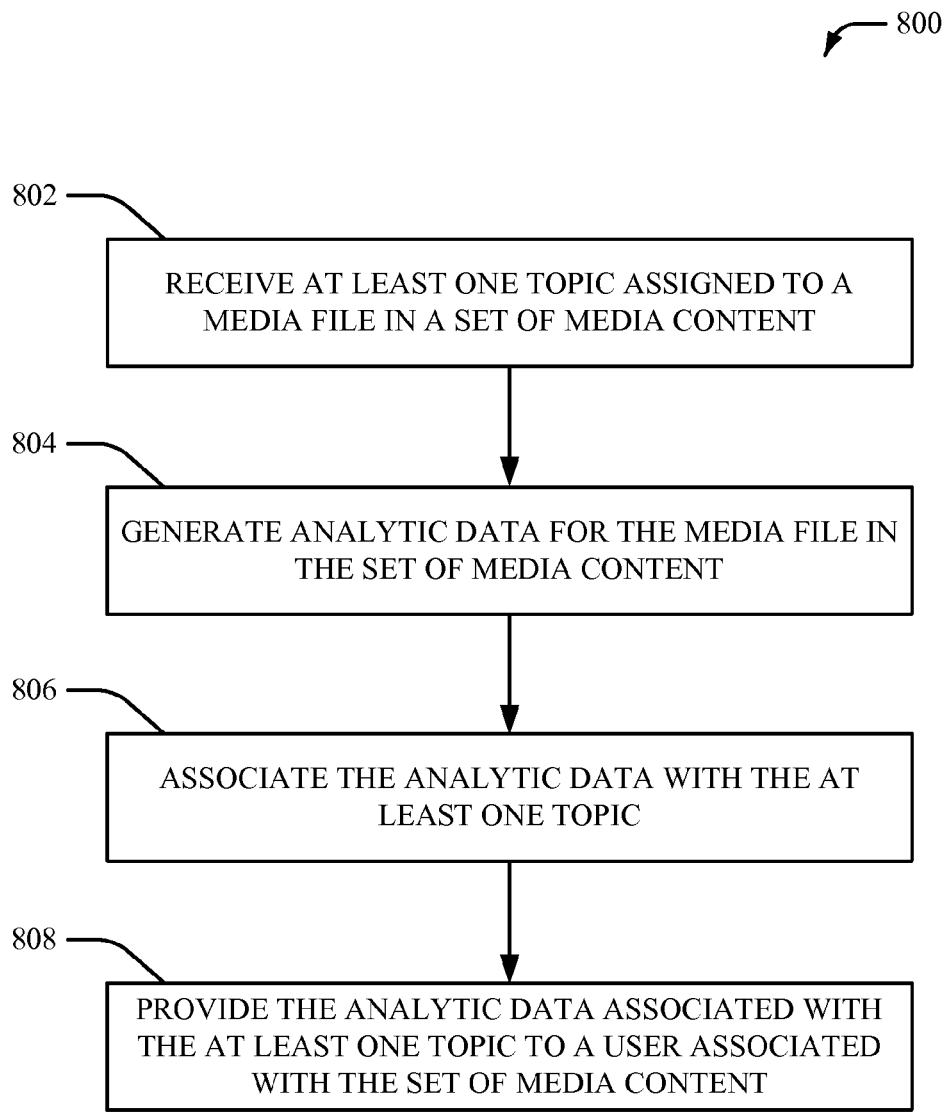
FIG. 8 depicts a flow diagram of an example method for generating analytic data for media content based on subject matter, in accordance with various aspects and implementations described herein.

Referring to FIG. 8, there illustrated is a methodology 800 for generating analytic data for media content based on subject matter, according to an aspect of the subject innovation. As an example, methodology 800 can be utilized in various applications, such as, but not limited to, media server systems, content management systems, network systems, computer network systems, communication systems, router systems, server systems, high availability server systems (e.g., Telecom server systems), Web server systems, file server systems, disk array systems, powered insertion board systems, cloud-based systems, etc. Specifically, the methodology 800 can generate analytic data for topics associated with media content.

At 802, at least one topic assigned to a media file in a set of media content is received (e.g., by an analytics component 106); for example, at least one topic (e.g., at least one subject matter category) assigned to a video in a set of videos (e.g., a media channel) is received. At 804, analytic data for the media file in the set of media content is generated (e.g., by an analytics component 106); for example, analytic data (e.g., statistical data) for the video in the set of videos (e.g., the media channel) is generated. At 806, the analytic data is associated with the at least one topic (e.g., using an analytics component 106); for example, analytic data for the video is associated with the at least one topic (e.g., the at least one subject matter category assigned to the video). At 808, the analytic data associated with the at least one topic is provided to a user associated with the set of media content (e.g., using an interface component 402). The analytic data associated with the at least one topic (e.g., the at least one subject matter category assigned to the video) can be presented (e.g., via a website) to a user associated with the set of videos (e.g., the media channel). In one example, the analytic data can be presented on a graphical user interface (GUI). In another example, the analytic data can be stored and/or shared via an application programming interface (API).

Figure 9:
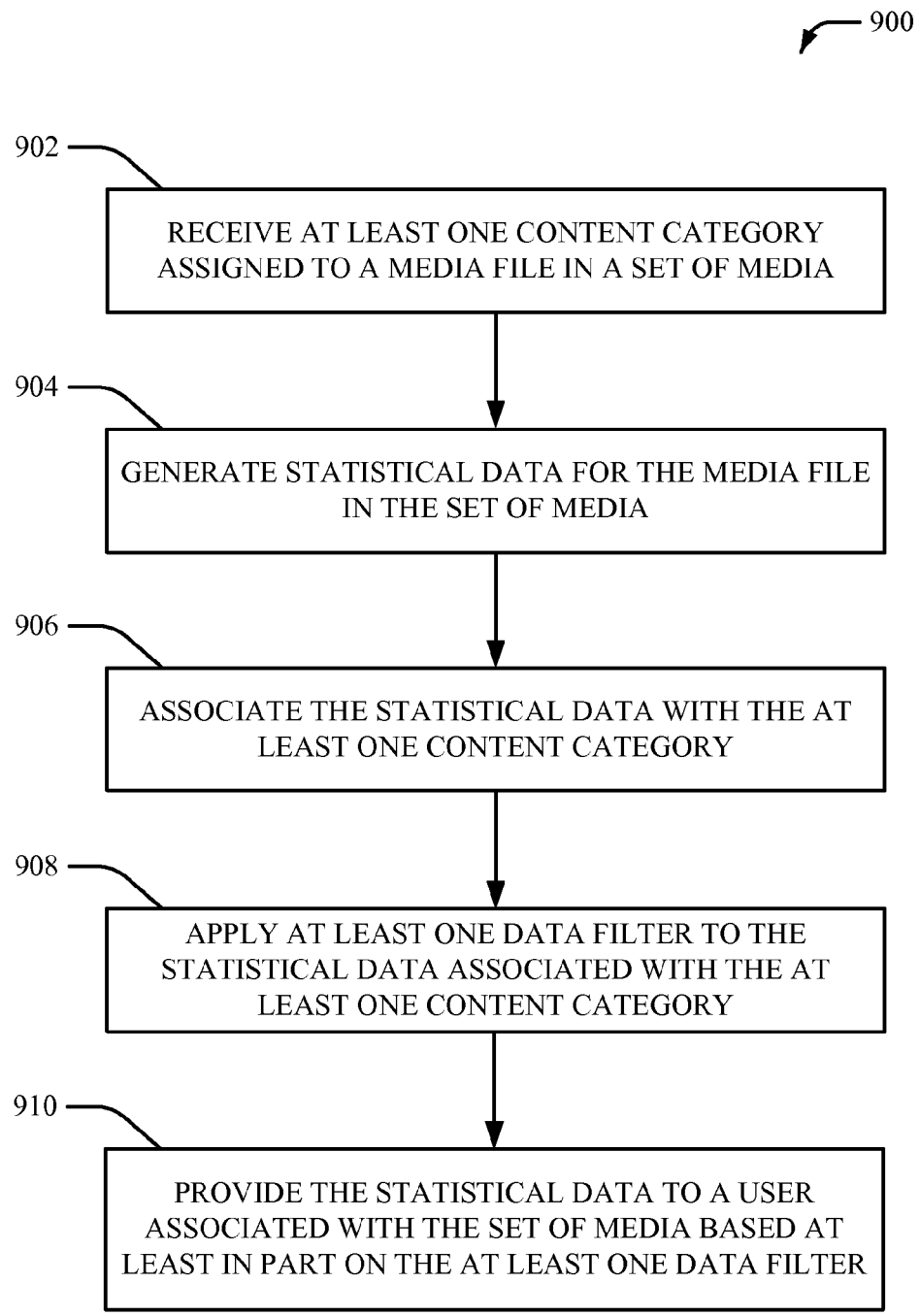
FIG. 9 depicts a flow diagram of an example method for filtering analytic data for media content, in accordance with various aspects and implementations described herein.

Referring to FIG. 9, there illustrated is an example methodology 900 for filtering analytic data (e.g., statistical data) for media content. At 902, at least one content category assigned to a media file in a set of media is received (e.g., by an analytics component 106); for example, at least one content category assigned to a video in a set of videos (e.g., a media channel) is received. At 904, statistical data for the media file in the set of media is generated (e.g., by an analytics component 106); for example, statistical data for the video in the set of videos (e.g., the media channel) is generated. At 906, the statistical data is associated with the at least one content category (e.g., using an analytics component 106); for example, the statistical data for the video is associated with the at least one content category. At 908, at least one data filter is applied to the statistical data associated with the at least one content category (e.g., using a filter component 202). For example, one or more data filters associated with a graphical user interface (GUI) can be applied to the statistical data associated with the at least one content category. At 910, the statistical data is provided to a user associated with the set of media (e.g., using an interface component 402) based at least in part on the at least one data filter. For example, the statistical data can be filtered and presented (e.g., via a website) to a user associated with the set of videos (e.g., the media channel) based at least in part on the at least one data filter.

Figure 10:
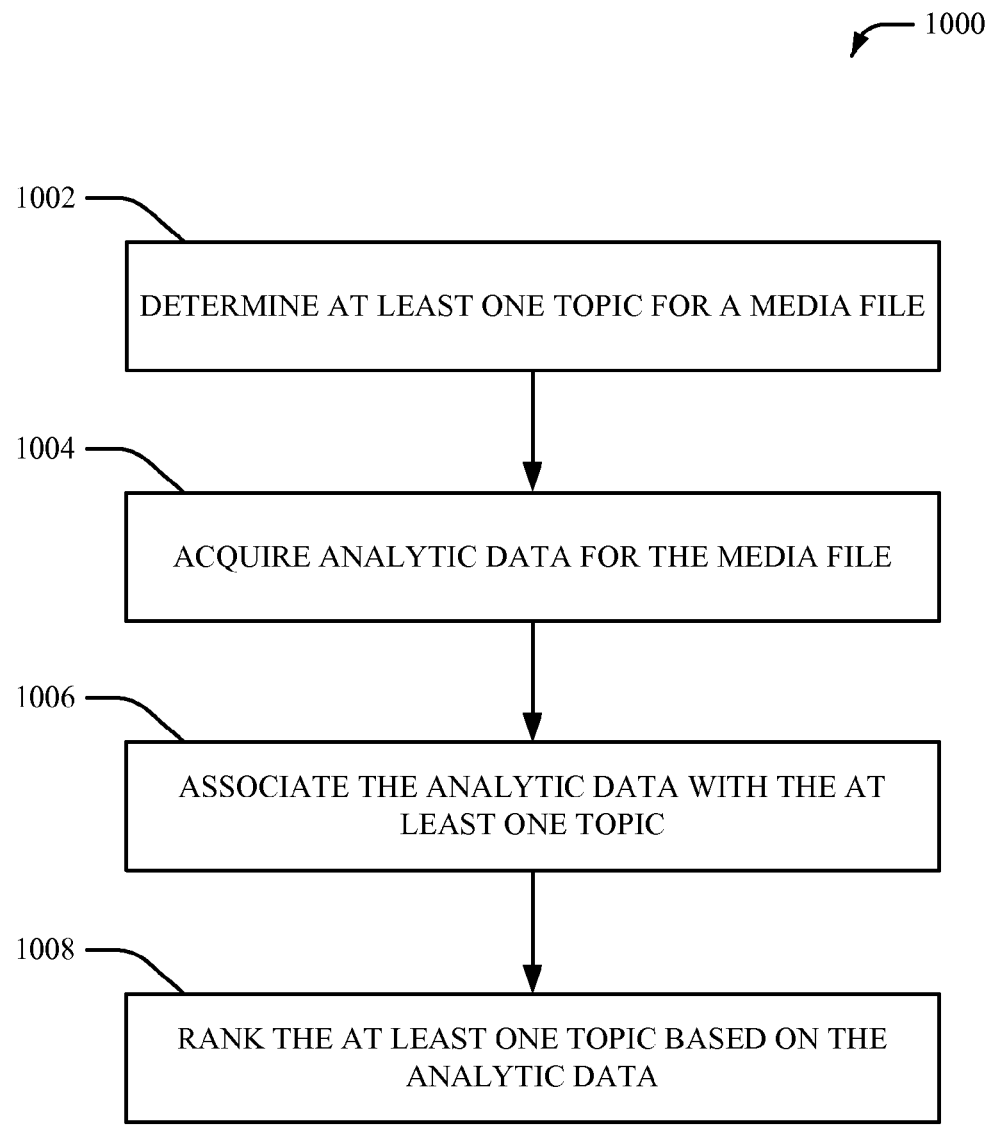
FIG. 10 depicts a flow diagram of an example method for ranking analytic data for media content, in accordance with various aspects and implementations described herein.

Referring to FIG. 10, there illustrated is an example methodology 1000 for ranking analytic data for media content. At 1002, at least one topic for a media file is determined (e.g., by a topics component 104). For example, at least one topic is determined for (e.g., associated with) a video. At 1004, analytic data for the media file is acquired (e.g., using an analytics component 106). For example, analytic data (e.g., statistical data) for the video is acquired. At 1006, the analytic data is associated with the at least one topic (e.g., using an analytics component 106). For example, analytic data for the video is associated with the at least one topic. At 1008, the at least one topic is ranked (e.g., using an analytics component 106) based on the analytic data. For example, topics associated with the media file can be ranked based on the analytic data. In another example, media files (e.g., videos) can be ranked according to a topic based on the analytic data.

Figure 11:
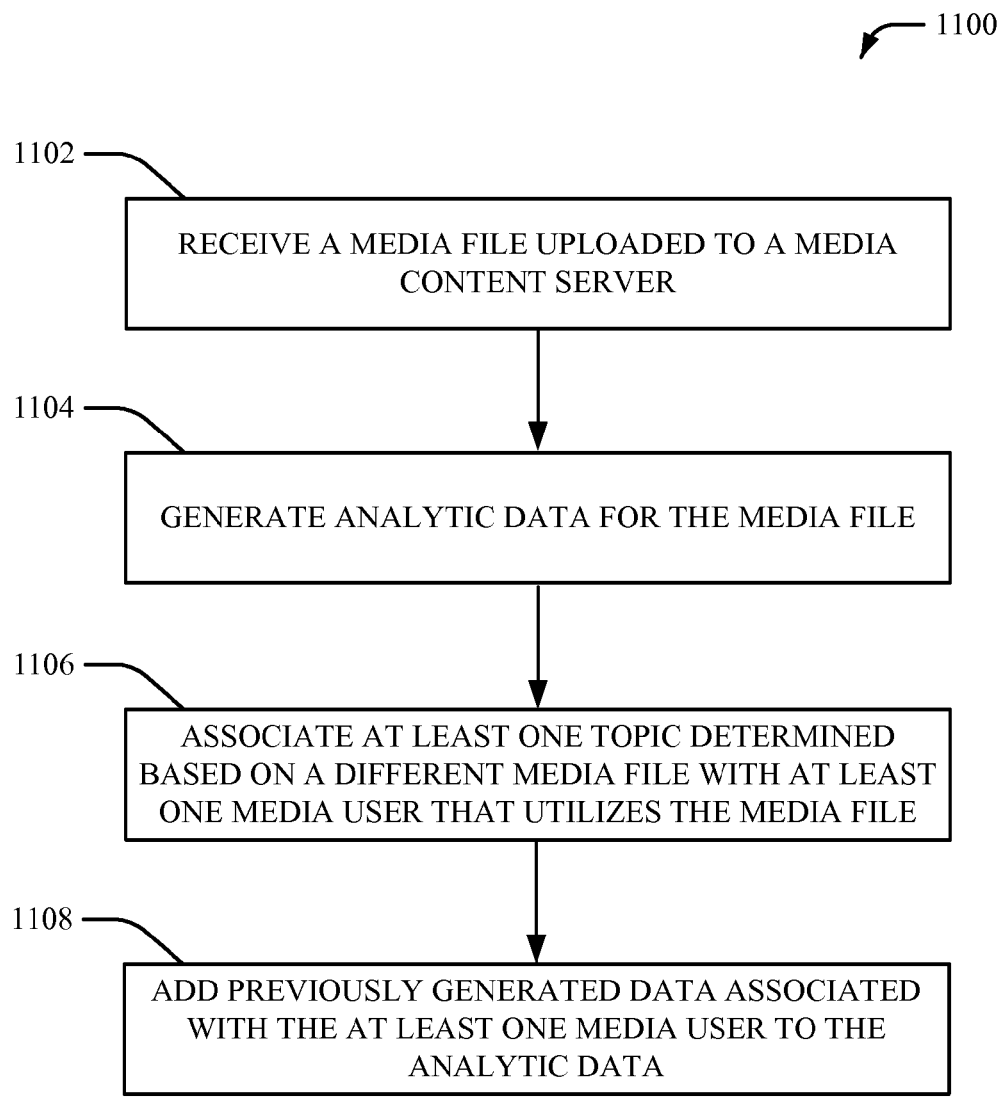
FIG. 11 depicts a flow diagram of an example method for generating analytic data for media content based on subject matter and user interests, in accordance with various aspects and implementations described herein.

Referring to FIG. 11, there illustrated is an example methodology 1100 for generating analytic data for media content based on subject matter and user interests. At 1102, a media file uploaded to a media content server is received (e.g., by a content component 102). For example, a user can upload the media file (e.g., a video) via a smart phone, a cell phone, a personal digital assistant (PDA), a tablet, a laptop, a desktop, a portable music player, a video game system, an electronic reader (e-reader), global positioning system (GPS), a set-top box, a television, etc. At 1104, analytic data for the media file is generated (e.g., by an analytics component 106). For example, analytic data (e.g., statistical data) for the video in the set of videos (e.g., the media channel) is generated. At 1106, at least one topic determined based on a different media file is associated with at least one media user that utilizes the media file (e.g., using an analytics component 106). For example, at least one viewer can view at least one previous video before viewing the video. As such, a topic profile can be generated (e.g., an interest profile for the at least one viewer) that includes one or more topics (e.g., interests of the at least one viewer). At 1108, previously generated data associated with the at least one media user is added to the analytic data (e.g., using an analytics component 106 and/or an interests component 302). For example, the one or more topics included in the topic profile can be added to the analytic data. As such, interests of the at least one viewer can be added to the analytic data. In one example, the one or more topics included in the topic profile can be different than one or more topics associated with the received media file.

Figure 12:
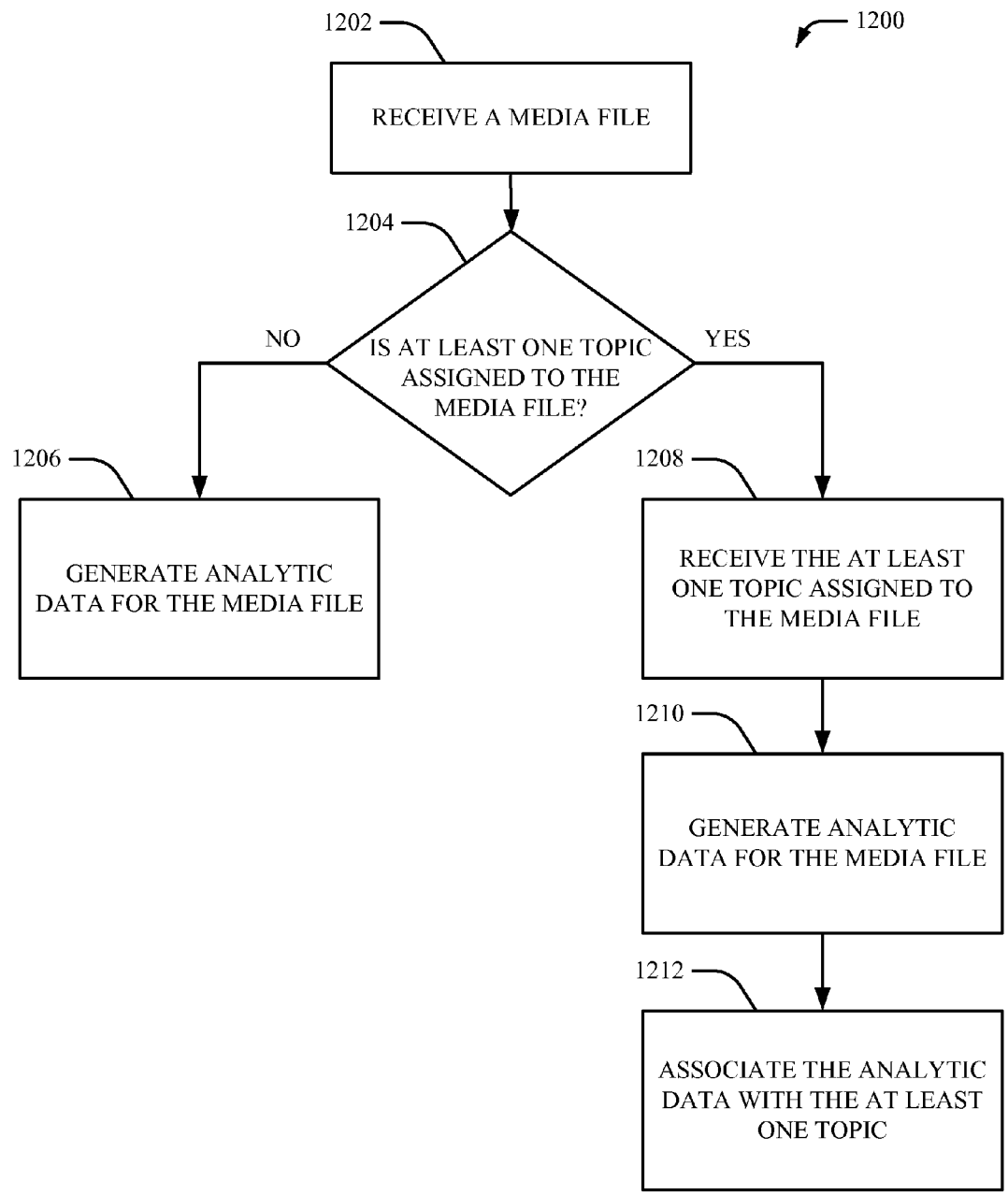
FIG. 12 depicts a flow diagram of an example method for generating analytic data for media content, in accordance with various aspects and implementations described herein.

Referring to FIG. 12, there illustrated is an example methodology 1200 for generating analytic data for media content. At 1202, a media file can be received (e.g., by a content component 102). For example, a media file (e.g., a video) uploaded to a media content server by a user can be received. At 1204, it can be determined whether at least one topic is assigned to the media file (e.g., by a topics component 104). For example, it can be determined whether a subject matter category is assigned to the media file (e.g., the video). In one example, it can be determined whether a subject matter category is assigned to the media file (e.g., the video) based at least in part on a confidence level value associated with the subject matter category for the media file. If no, the methodology 1200 proceeds to 1206. At 1206, analytic data for the media file can be generated (e.g., by an analytics component 106). For example, statistical data can be generated for the media file (e.g., the video). However, a topic is not associated with the analytic data. If yes, the methodology proceeds to 1208. At 1208, at least one topic assigned to the media file can be received (e.g., by an analytics component 106). For example, subject matter assigned to the media file (e.g., the video) can be received. At 1210, analytic data for the media file can be generated (e.g., by an analytics component 106). For example, statistical data can be generated for the media file (e.g., the video). At 1212, the analytic data can be associated with the at least one topic (e.g., using an analytics component 106). For example, analytic data for the media file (e.g., the video) can be associated with the subject matter assigned to the media file (e.g., the video).

Figure 13:
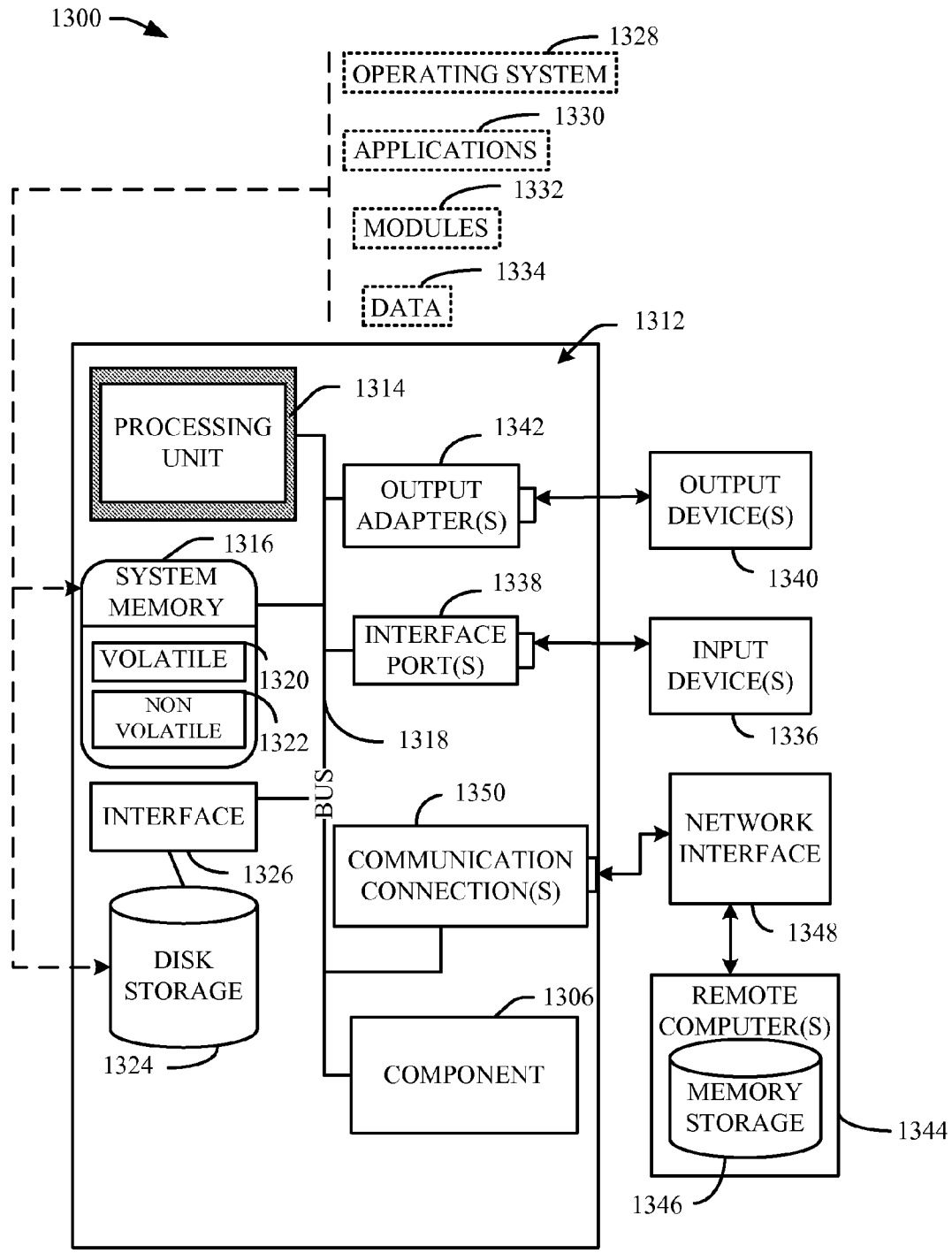
FIG. 13 is a schematic block diagram illustrating a suitable operating environment.
Figure 14:
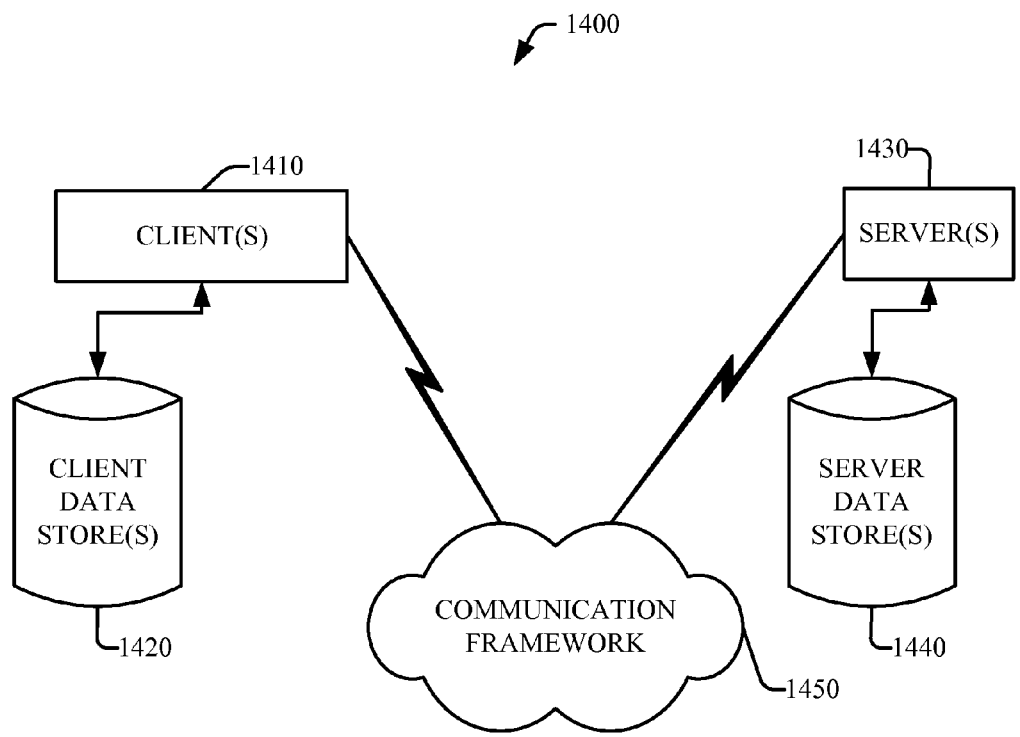
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented.

With reference to FIG. 13, a suitable environment 1300 for implementing various aspects of this disclosure includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

FIG. 13 also depicts software that acts as an intermediary between users and the basic computer resources described in the suitable operating environment 1300. Such software includes, for example, an operating system 1328. Operating system 1328, which can be stored on disk storage 1324, acts to control and allocate resources of the computer system 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

It is to be appreciated that the computer 1312 can be used in connection with implementing one or more of the systems or components shown and described in connection with FIGS. 1-4. In accordance with various aspects and implementations, the computer 1312 can be used to associate one or more topics (e.g., one or more subject matter categories) for media content with analytic data. In certain exemplary embodiments, the computer 1312 includes a component 1306 (e.g., the content component 102 and/or the interface component 402) that can contain, for example, a topics component, an analytics component, a filter component and/or an interests component, each of which can respectively function as more fully disclosed herein.

FIG. 14 is a schematic block diagram of a sample-computing environment 1400 with which the subject matter of this disclosure can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing this disclosure, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1420 that can be employed to store information local to the client(s) 1410. Similarly, the server(s) 1430 are operatively connected to one or more server data store(s) 1440 that can be employed to store information local to the servers 1430.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., content component, topics component, analytics component, filter component, interests component and/or interface component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory storing computer executable components; and
a processor configured to execute the following computer executable components stored in the memory:
a topics component that assigns at least one topic to a media file in a set of media content, wherein the at least one topic is assigned based upon the at least one topic having respective confidence levels meeting a threshold confidence value, and the respective confidence levels are weighted based upon respective numbers of times the media file is consumed in different contexts; and
an analytics component that generates analytic data for the media file in the set of media content and associates the analytic data with the at least one topic, wherein the analytic data is associated with at least one media user that utilizes the media file and includes respective intervals of time between views of the media file by the at least one media user.

2. The system of claim 1, wherein the analytic data further includes a monetary value of a source used by the at least one media user to find the media file.

3. The system of claim 1, wherein the respective confidence levels are further weighted based upon respective content in the media file.

4. The system of claim 1, wherein the analytics component ranks the at least one topic as a function of the analytic data.

5. The system of claim 1, wherein the analytic data further includes respective playback devices used by the at least one media user to consume the media file.

6. The system of claim 1, further comprising an interface component that provides the analytic data to a user associated with the set of media content based.

7. A method, comprising:
assigning, by a system including a processor, at least one topic to a media file in a set of media content, wherein the at least one topic is assigned based upon the at least one topic having respective confidence levels meeting a threshold confidence value, and the respective confidence levels are weighted based upon respective numbers of times the media file is consumed in different contexts;
generating, by the system, analytic data for the media file in the set of media content, wherein the analytic data is associated with at least one media user that utilizes the media file and includes respective intervals of time between views of the media file by the at least one media user; and
associating, by the system, the analytic data with the at least one topic.

8. The method of claim 7, wherein the analytic data further includes a monetary value of a source used by at least one media user to find the media file.

9. The method of claim 7, further comprising:
ranking the at least one topic based on the analytic data.

10. A non-transitory computer-readable medium having instructions stored thereon that, in response to execution, cause a system including a processor to perform operations comprising:
assigning at least one content category to a media file in a set of media, wherein the at least one topic is assigned based upon the at least one topic having respective confidence levels meeting a threshold confidence value, and the respective confidence levels are weighted based upon respective numbers of times the media file is consumed in different contexts;
generating analytic data for the media file in the set of media, wherein the analytic data is associated with at least one media user that utilizes the media file and includes respective intervals of time between views of the media file by the at least one media user; and
associating the analytic data with the at least one content category.

11. The non-transitory computer-readable medium of claim 10, wherein the respective confidence levels are further weighted based upon respective content in the media file.

* * * * *